United States Patent [19]

Overbay

[11] Patent Number: 4,722,122
[45] Date of Patent: Feb. 2, 1988

[54] ROTATION STATION FOR REMOTELY INSTALLING MECHANICAL TUBE PLUGS

[75] Inventor: Mark A. Overbay, East Ridge, Tenn.

[73] Assignee: Combustion Engineering, Inc., Windsor, Conn.

[21] Appl. No.: 853,587

[22] Filed: Apr. 18, 1986

[51] Int. Cl.⁴ .......................... B23P 7/00; B23P 19/00
[52] U.S. Cl. .................... 29/157.3 R; 29/402.01; 29/723; 29/726
[58] Field of Search ............ 29/157.3 R, 402.01, 29/402.07, 402.09, 723, 726, 727, 715, 522, 523; 137/15

[56] References Cited

U.S. PATENT DOCUMENTS

| | | | |
|---|---|---|---|
| 4,205,939 | 6/1980 | Reyes | 29/402.01 |
| 4,205,940 | 6/1980 | Golick | 29/402.01 |
| 4,369,662 | 1/1983 | Rubin et al. | 29/522 R |
| 4,586,250 | 5/1986 | Cooper, Jr. et al. | 29/723 |

FOREIGN PATENT DOCUMENTS

| | | | |
|---|---|---|---|
| 2838019 | 3/1980 | Fed. Rep. of Germany | 29/402.01 |
| WO80/00006-72 | 4/1980 | PCT Int'l Appl. | 29/723 |
| 2110385 | 6/1983 | United Kingdom | 29/723 |

Primary Examiner—Mark Rosenbaum
Assistant Examiner—Irene Graves Golabi
Attorney, Agent, or Firm—John H. Mulholland

[57] ABSTRACT

A method and apparatus for installing a mechanical tube plug 74 to assure the integrity of the seal between the tube plug 74 and tube 66. The actual torque applied in accomplishing each step in the tube plug installation process is monitored and recorded to assure that the integrity of each step of the tube plug installation process is maintained and, therefore, the integrity of the seal is assured.

12 Claims, 11 Drawing Figures

ROTATION STATION FOR REMOTELY INSTALLING MECHANICAL TUBE PLUGS

BACKGROUND OF THE INVENTION

This invention relates to installing mechanical tube plugs and, in particular, to a method and apparatus for installing mechanical tube plugs including recording and monitoring the torque applied in the process to evaluate the work done and assure the integrity of the plug installation.

A heat exchanger in a nuclear steam supply system extracts heat from a closed primary loop fluid that circulates through the reactor and the heat exchanger and transfers the heat to a closed secondary loop fluid that circulates through the heat exchanger and a steam turbine where energy is extracted from the closed secondary loop fluid in the form of mechanical energy. The heat exchanger is comprised of a vessel containing a plurality of U-shaped tubes around which the fluid of the secondary loop passes and through which the fluid of the primary loop circulates. Heated water from the reactor enters the vessel in which the heat exchanger is housed beneath a tube sheet in the first side of a divided plenum. The heated water passes into and through the U-shaped tubes with both ends terminating in the tube sheet, thence into the second side of the divided plenum, thence from the vessel back to the reactor for reheating. While passing through the U-shaped tubes, the two fluids are heat exchange relationship with commingling of the fluids prevented only by the integrity of the heat exchanger tubes. It is imperative to maintain the fluids of the two loops isolated one from the other. Over the life of the nuclear steam supply system, some of the tubes of the heat exchanger deteriorate. During outages, the tubes of the heat exchanger are nondestructively tested to ascertain which tubes, if any, should be removed from service to assure the integrity of the heat exchanger. Since the heat exchanger is typically designed with more than the minimally necessary number of tubes, some tubes may be removed from service and the heat exchanger placed back in operation.

One method of removing a heat exchanger tube from service is to plug both ends of the tube where the tube terminates in the tube sheet. One method of plugging a tube end includes inserting a mechanical plug having an outside diameter slightly less than the inside diameter of the tube being plugged, the tube plug being inserted flush with the tube sheet. The plug is expanded by rolling the inner surface of the plug forming a mechanical rolled joint between the outer surface of the tube plug and the inside surface of the tube.

The rolling equipment, whether manual or automatic, is typically designed to stall at a predetermined torque. The integrity of the mechanical rolled joint is inferred from the torque at which the rolling equipment stalls. The rolling equipment is calibrated periodically to insure a consistent, acceptable rolled joint. However, as the rolling equipment is used repetitively, temperature changes in the clutch mechanism that stalls the rolling equipment at a predetermined torque can cause the rolling equipment to stall at different torque values thereby negating the integrity of the mechanical rolled joint. The effects of lubricant in the rolling equipment and the influence of temperature on the lubrication can have similar consequences thereby placing the integrity of a mechanically rolled joint, rolled by equipment that is designed to stall at a predetermined torque, in question.

A method and apparatus for installing mechanical tube plugs in which the actual torque applied in the installation process is monitored and recorded is needed to assure the integrity of the plug installation. Such a method and apparatus would permit real time monitoring of the torque applied in each step of the tube plug installation process, such that after each step in the mechanical tube plug installation process, the integrity of that step could be assured and further after the installation of a mechanical tube plug is complete, the integrity of the mechanical rolled joint may be assured and documented by the recording of the torque during each step of the installation process.

SUMMARY OF THE INVENTION

The present invention provides an improvement over the prior art techniques for installing mechanical tube plugs in that the rotational torque applied during each step of the installation process is recorded and is monitored in real time to assure that the torque applied during each step of installing a mechanical tube plug provides its contribution to the integrity of the installation of a mechanical tube plug. The recorded torque curves further provide documentation for verification of the integrity of the installation or for regulatory purposes. In accordance with the present invention, a rotation station used in conjunction with a robotic manipulator can service substantially the entire tube sheet and incorporates a reversible drive means to provide torque, a tool holder to hold a brush during a brushing operation, a roller-cage-mandrel assembly during rolling of the internal surface of the tube entrance, a plug insertion tool to insert plugs into rolled tubes to be plugged and a plug rolling roller-cage-mandrel assembly. The torque applied to the tool holder is converted to a representative electrical signal by a reaction torque sensor and recorded. The work done in rolling the tube plug, as represented by the area under the recorded torque curve between the tube plug contacting the interior surface of the tube and the torque reaching a predetermined torque limit setpoint, is compared to a predetermined acceptable amount of work required to provide a predetermined amount of wall thinning. If the work done in rolling the tube plug is less than the predetermined acceptable amount of work, insufficient work has been done to achieve wall thinning and the tube plug may be rerolled or replaced. The recorded torque signal for all tube preparation and tube plug rolling operations is monitored for informative characteristics as well as irregularities indicative of specific problems.

BRIEF DESCRIPTION OF THE DRAWING

FIG. 5 is a typical mechanical tube plug having near its outer end a tapered, slightly enlarged diameter to provide a light interference fit with the tube in which it is inserted;

DESCRIPTION OF THE PREFERRED EMBODIMENT

Figure 1:
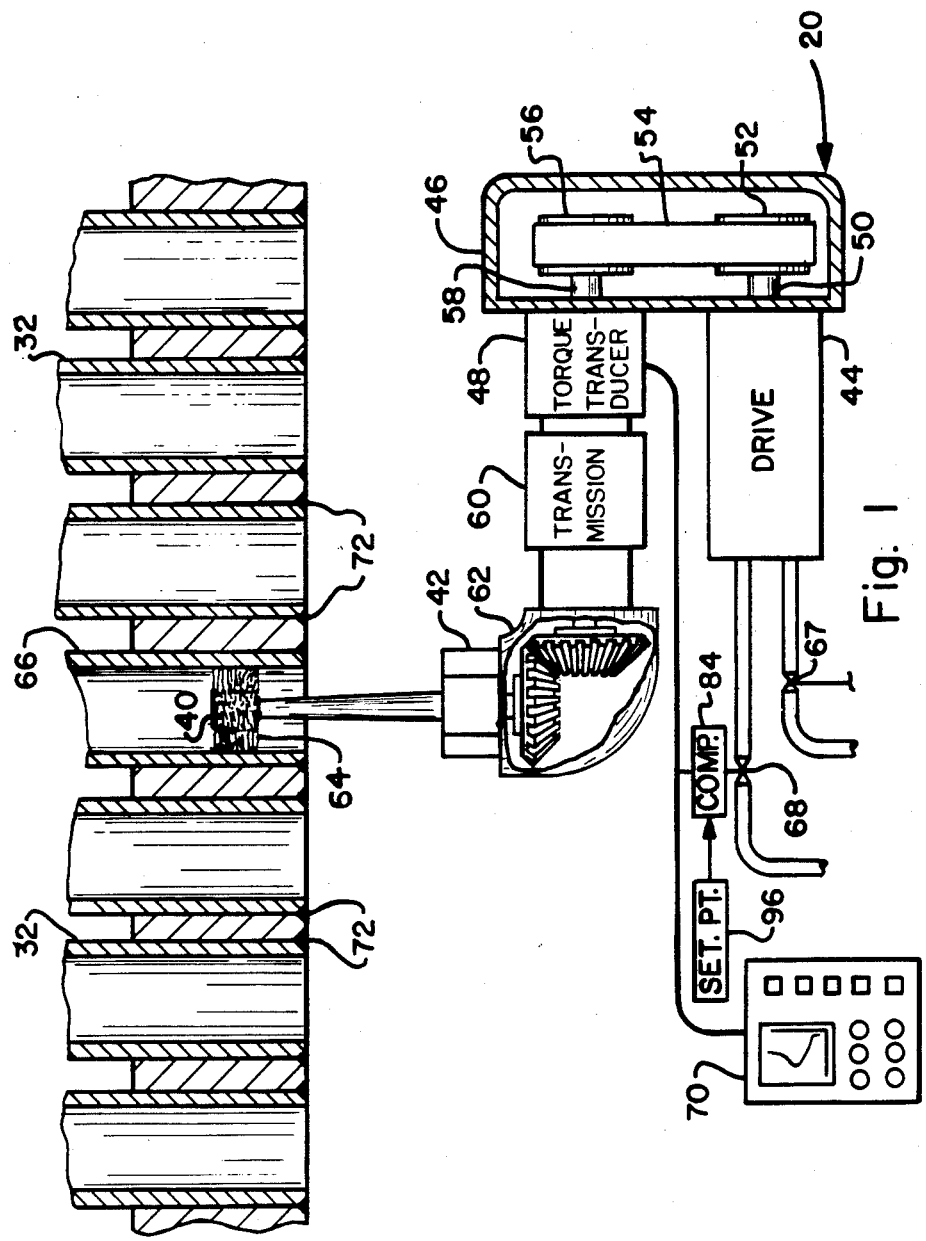
FIG. 1 is a schematic drawing, partly in section, showing the rotation station drive aligned with a tube to be plugged undergoing a brushing operation.
Figure 4:
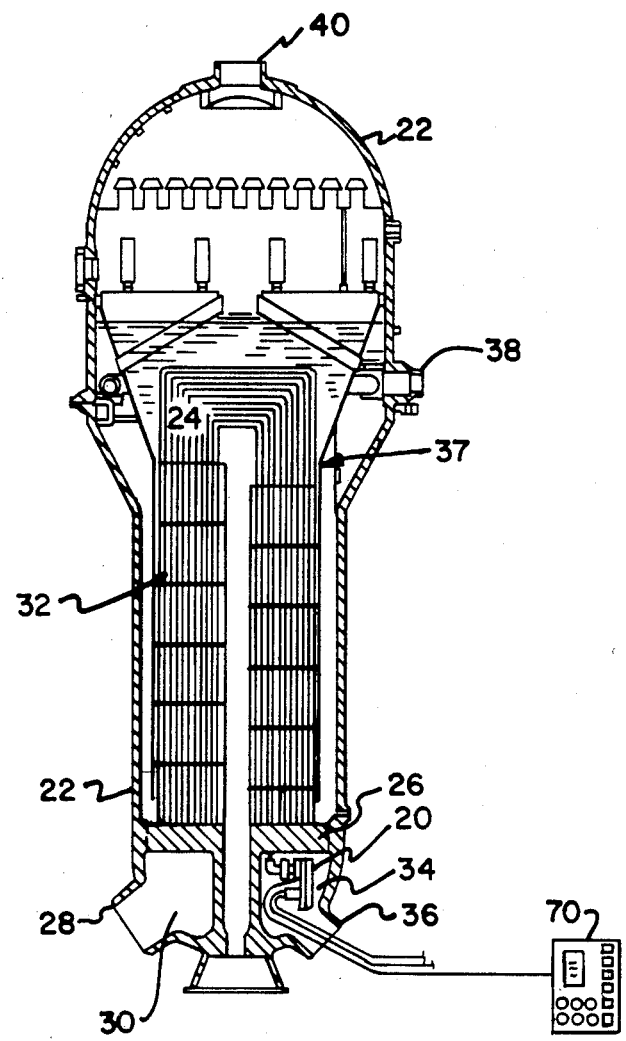
FIG. 4 shows the heat exchanger housing, partly in section, and the heat exchanger tubes originating and terminating in the tube sheet.

Referring to the drawing, initially to FIG. 1 there is depicted therein a rotation station 20 for use with a robotic manipulator (not shown) for installing mechanical tube plugs in accordance with the present invention. As best seen in FIG. 4, heated water from the nuclear reactor (not shown) enters vessel 22, in which heat exchanger 24 is housed, beneath tube sheet 26 through inlet port 28 to the first side 30 of a divided substantially hemispherical plenum. The heated water, typically radioactive, passes upwardly through tube sheet 26 thence through a plurality of inverted U-shaped tubes 32 back through tube sheet 26 into the second side 34 of the divided hemispherical plenum, thence from vessel 22 through outlet port 36 back to the reactor for reheating. While passing through tubes 32, the heated water is in heat exchange relationship with the secondary loop fluid which enters vessel 22 through inlet port 38 above tube sheet 26, passes downwardly through the annular space between shroud 37 and vessel 22 thence upwardly through heat exchanger 24 around the exterior of tubes 32 increasing in temperature and exits from vessel 22 through outlet port 40. The heated secondary fluid is typically transported to a steam turbine where energy is extracted from the fluid in the form of mechanical rotation.

The tubular heat exchanger is commonly referred to as a steam generator in a nuclear steam supply system. The steam generator typically has incorporated in its design more tubes than are necessary for operation of the heat exchanger so that when tubes that have the potential of leaking are identified by a nondestructive examination process such as eddy current testing, the tubes 32 so identified may be removed from service such as by plugging both ends thereof and the steam generator may be subsequently placed back in operation with the non-plugged tubes functioning. This obviates the potential of radioactive primary fluid being passed through a defective tube to the secondary fluid of the heat exchanger.

To insert tube plugs into both ends of a steam generator tube 32 being removed from service, rotation station 20 and a robotic manipulator are placed within vessel 22 beneath tube sheet 26.

As best seen in FIG. 1, a wire brush 64, typically stainless steel, having bristles the outer ends of which form an outside diameter slightly greater than the inside diameter of tubes 32, is inserted into the drive chuck 42 of rotation station 20. In the preferred embodiment, rotation station 20 is comprised of reversible pneumatic drive 44, such as Cleco Nutrunner model 157, mounted from rotation station body 46. The torque produced by reversible pneumatic drive 44 is transferred to torque transducer 48, such as the isolated reaction transducer attachment for the Cleco model 157 not runner, through shaft 50, drive pulley 52, timing belt 54, pulley 56 and shaft 58. Torque transducer 48 is also mounted from rotation station body 46. The rotational output of torque transducer 48 is provided to transmission 60 which is a 15:1 stacked planetary transmission having several small planetary transmissions in series which reduce the revolutions per minute by 15 times and thereby increase torque by 15 times, exclusive of mechanical losses therein. The rotational output from transmission 60 is provided to beveled gears 62 which change the orientation of rotation from horizontal to vertical and drives drive chuck 42. Straight cut beveled gears have been used in the preferred embodiment because of their ready availability, strength and reliability. This design of rotation station 20 results in a very compact rotation station which has 100% tube sheet coverage.

With a brush installed in rotation station 20 drive chuck 42, the robotic manipulator (not shown) positions rotation station 20 beneath a tube 66 to be plugged with the shaft of brush 64 is axially aligned with the tube 66 of heat exchanger tubes 32. The brush is moved axially with respect to the shaft thereof until the first few bristles on the brush are placed in contact with the opening of tube 66. Brush 64 rotation is initiated by opening solenoid valve 68 thereby providing air to reversible pneumatic drive 44. With brush 64 rotating, brush 64 is then extended into tube 66 approximately 2½ inches to the region where tube plug 74 will seat and the inside surface of tube 66 is brushed for a predetermined time period of approximately 15 seconds. The brushing operation removes foreign matter such as oxides.

Figure 6:
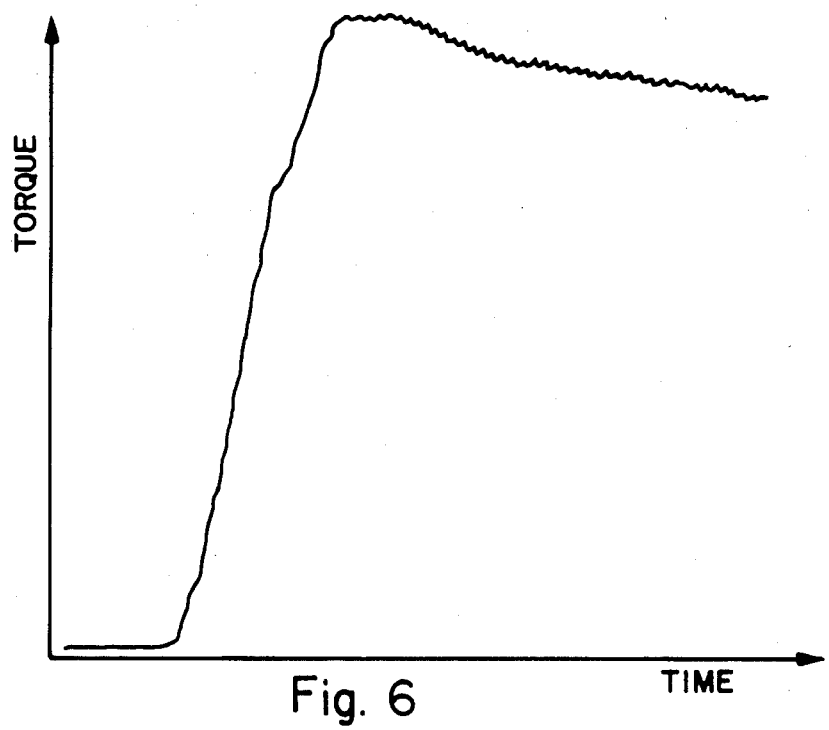
FIG. 6 is a typical torque as a function of time curve produced during a tube internal surface brushing operation as recorded on a strip chart recorder.

During the brushing operation, the torque provided to rotate brush 66 is monitored by torque transducer 48 and converted to an electrical signal representative of torque which is conducted outside vessel 22 to strip chart recorder 70. A typical torque as a function of time curve for the brushing operation is shown as FIG. 6. As the brush is inserted the torque is low in the range of 2 to 3 inch pounds and increasing during the brushing operation as the foreign matter is removed from the inside surface of tube 66. The torque peaks out at around 22-23 inch pounds as the foreign matter is totally removed and the inside surface of the tube begins slightly fretting. Fretting causes a slight wear of the inside surface of the tube which increases friction. The brush shaft acts as a tension spring producing some oscillations as the brush is withdrawn at a rate that attempts to maintain approximately constant torque until the bristles of the brush 64 being exiting from tube 66. Fretting the interior surface of tube 66 provides an excellent surface of approximately 63 RMS to seat a plug against.

The operator observes the torque as a function of time curve as recorded on strip chart recorder 70 in real time to detect a sharp increase in torque subsequent to brush 64 being inserted followed by a steep torque curve indicating that the foreign matter is being removed during brushing followed by a peaking out of the torque curve indicating fretting of the interior surface. After completion of the brushing operation, brush 64 is removed from drive chuck 42.

Figure 7:
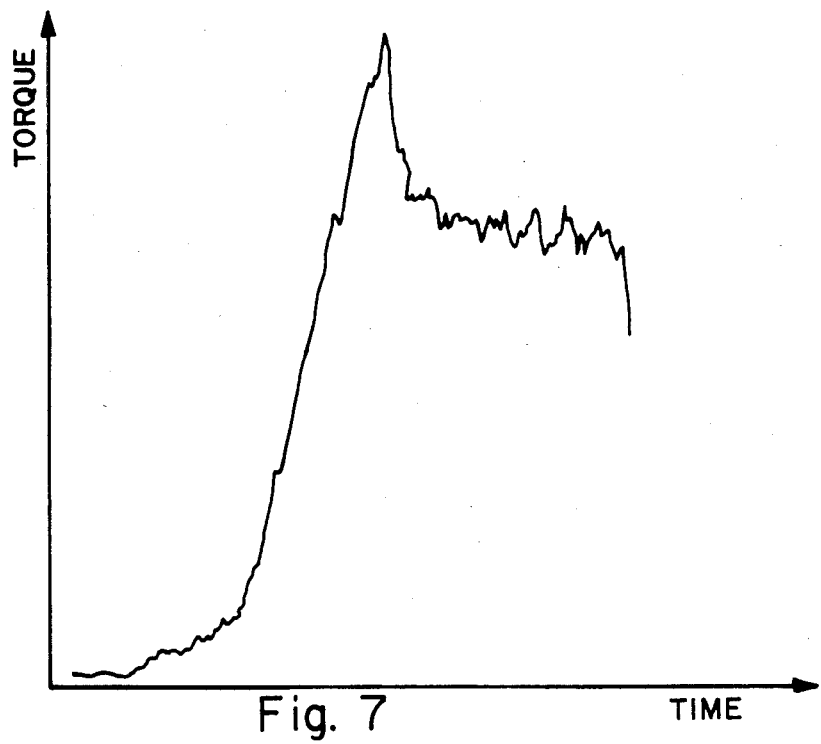
FIG. 7 is a typical torque as a function of time curve produced during a weld size roll operation as recorded on a strip chart recorder.

A tube entrance rolling roller-cage-mandrel assembly 69 is inserted into rotation station 20 drive chuck 42 and rotation station 20 is again positioned beneath tube 66. During manufacture of heat exchanger 24, the ends of tubes 32 are flush with the primary face of tube sheet 26. The tubes are welded to the face of tube sheet 26 forming circumferential weld 72 while heat exchanger 24 is laying on its side. An orbital welding process welds each tube 32 circumferentially to tube sheet 26 to assure that radioactive fluid on the primary side does not pass between tube 32 and tube sheet 26 to mingle with fluid on the secondary side. As tubes 32 are welded, in the lower half of the circumference, gravity pulls the weld 72 down away from the tube opening. However, in the upper half of the circumference, gravity pulls the weld 72 down into the circumference resulting in an oval shaped opening. The tube sizing operation rolls the end of the brushed tube where it is welded to tube sheet 26. The sizing roll is small enough to enter the oval opening and makes the opening substantially round by displacing the small amount of weld rollover to accommodate insertion of a tube plug. During the tube sizing operation, the torque applied to the roller-cage-mandrel assembly 69 is converted to an electrical signal by torque transducer 48 and supplied to strip chart recorder 70 for recording. The strip chart recording of torque is monitored in real time by an operator. A typical torque as a function of time curve for a tube sizing operation or weld size rolling operation is shown as FIG. 7.

Figure 2:
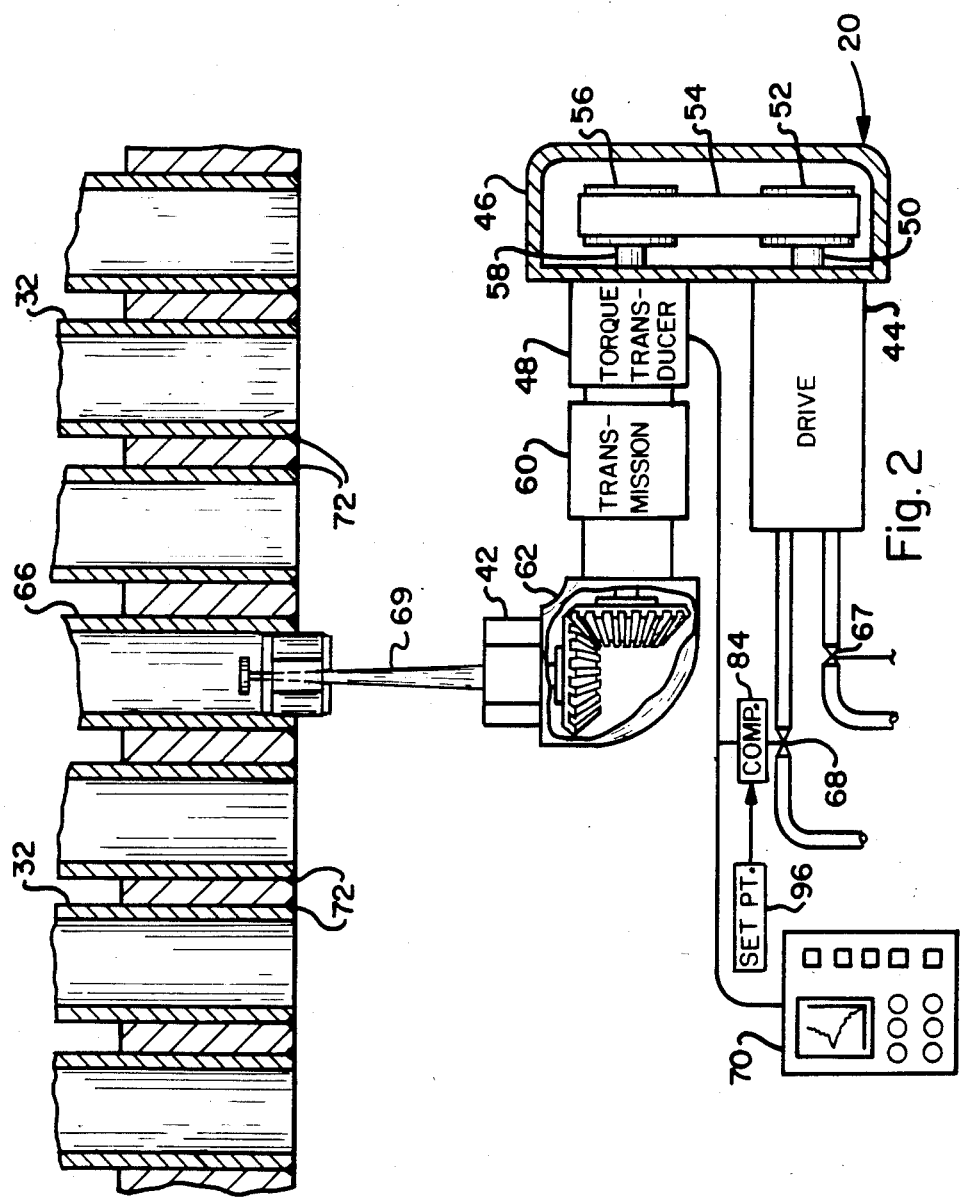
FIG. 2 is a schematic drawing, partly in section, showing the rotation station drive aligned with a tube to be plugged undergoing a weld roll sizing operation.

With rotation station 20, position beneath tube 66 with axial alignment of the roller-cage-mandrel assembly 69 with tube 66, the roller-cage-mandrel assembly with the rolls compressed against the tapered mandrel is inserted into the entrance of tube 66. The rolling operation, shown in FIG. 2, provides a tube opening that although not necessarily circular provides a good interference fit for the tapered end of a mechanical tube plug to seat against. The rollers on the roller-cage-mandrel assembly 69, typically an odd number, are canted and, therefore, self-feeding such that the mandrel will pull itself into the tube. The rolls are size limited to cease enlarging the entrance to tube 66 at a predetermined diameter to accommodate a tube plug.

Much useful information can be obtained from the torque as a function of time curve produced by strip chart recorder 70 during a tube entrance sizing operation. If very little torque was required during the tube entrance sizing operation, this is an indication of an oversized tube entrance and may necessitate a greater flare on a tube plug to provide an interference fit. A fairly smooth leading side to the torque curve indicates that the interior of the tube was fairly smooth and fairly round. A tube opening may not be perfectly round subsequent to a tube entrance sizing operation, however, the cyclic increases in torque due to imperfections around the circumference of the tube entrance should decrease as the tube entrance sizing process progresses.

Peaks and plateaus in the torque curve are significant. The peak indicates that the worst imperfection in the tube entrance has been overcome at the predetermined desired diameter of the tube entrance. The plateau following the peak indicates that the work required to smooth out the remaining imperfections requires less energy than the worst imperfection in going from a rough finish to a smoother finish. Plateaus are further uneven because there is no lubricant on the entrance sizing roll and, therefore, there is erratic friction in the torque curve.

During the tube entrance sizing operation, the operator monitors the strip chart indication of torque. The operator terminates the rolling process based upon the torque curve indicating that the tube entrance has been rounded out sufficiently to accept a tube plug 74 with a slight interference fit. When the tube entrance sizing operation is completed, the direction of rotation of reversible pneumatic drive 44 is reversed releasing the roller-cage-mandrel assembly 69. The roller-cage-mandrel assembly 69 is withdrawn from the entrance of tube 66. The roller-cage-mandrel assembly 69 and rotation station 20 are removed from the robotic manipulator (not shown) and replaced with a device (not shown) to insert tube plugs. The tube insertion device is positioned beneath tube 66 and a tube plug 74 is inserted into the entrance of tube 66 to be flush with the primary surface of tube sheet 26. As shown in FIG. 5, tube plug 74 may have a slightly enlarged diameter 76 to provide a slight interference fit with tube 66. Tube plug 74 may have a band of ductile metal 78 surrounding tube plug 74 in the region where tube plug 74 is expanded in accordance with U.S. Pat. No. 4,513,786 which is hereby incorporated by reference.

Figure 3:
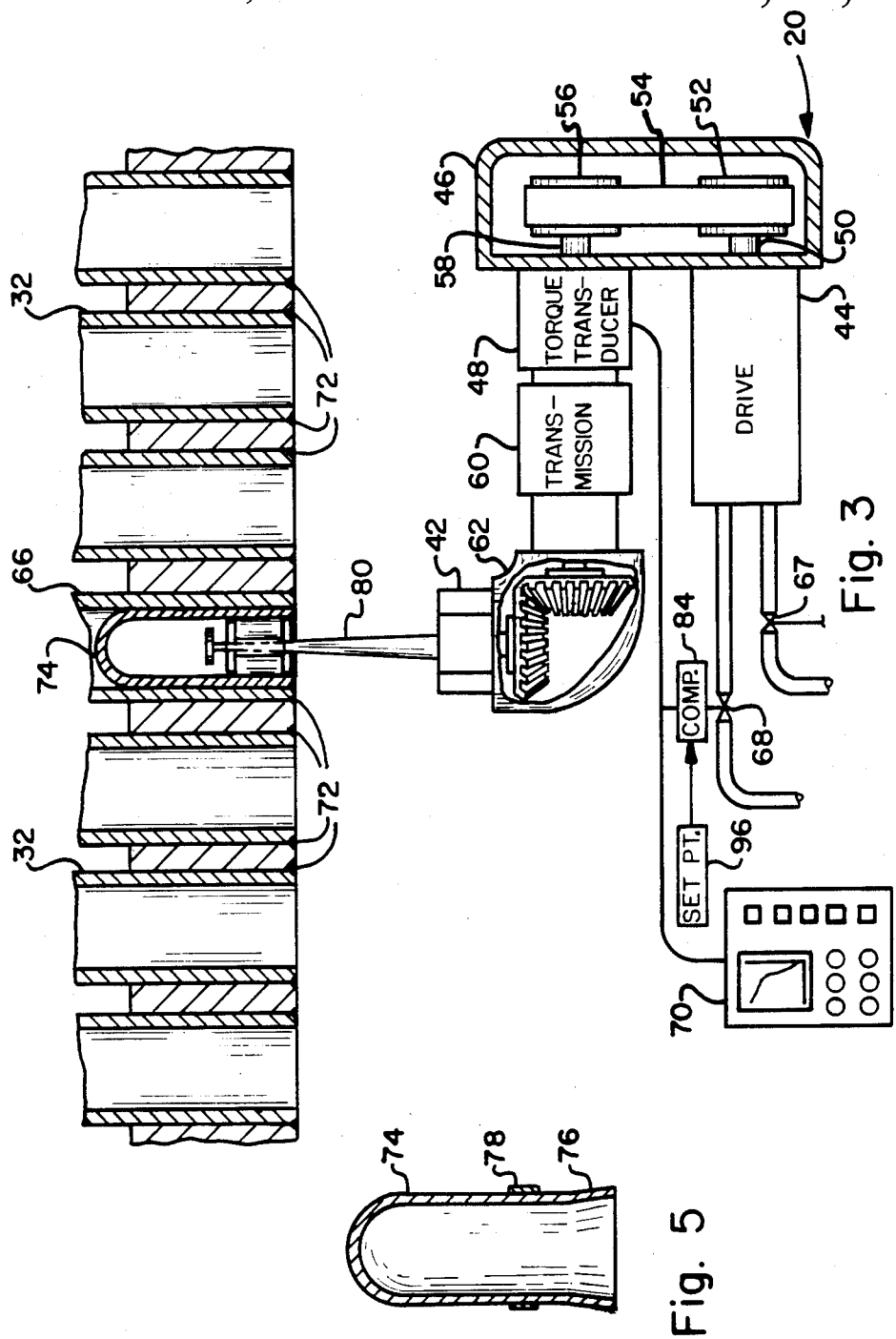
FIG. 3 is a schematic drawing, partly in section, showing the rotation station drive aligned with a tube to be plugged having a mechanical tube plug inserted therein and undergoing a plug roll operation.

The tube plug inserting device is removed from the robotic manipulator. A tube plug rolling roller-cage-mandrel assembly 80 is inserted into rotation station 20 drive chuck 42 and rotation station 20 is again installed on the robotic manipulator. Rotation station 20 is positioned beneath tube 66 having tube plug 74 inserted therein. Tube plug rolling roller-cage-mandrel assembly 80 is an axially inserted into tube plug 74. Solenoid valve 68 is energized providing air to reversible pneumatic drive 44 in turn providing torque to rotation station 20 drive chuck 42 which rolls the interior surface of tube plug 74 as shown in FIG. 3. Enough work must be done on tube plug 74 to develop a predetermined amount of residual hoop stress to cause a seal between the exterior surface of tube plug 74 and the interior surface of tube 66. Residual hoop stress is a residual outward radial force on the interior surface of tube 66 exerted by the exterior surface of tube plug 74.

The torque provided to rotate drive chuck 42 during the plug rolling operation is converted to an electrical signal by torque transducer 48 and recorded on strip chart recorder 70. A typical torque as a function of time curve recorded during a plug roll operation is shown as FIG. 8. The plug rolling operation is done with a lubricated roller-cage-mandrel assembly 80 so that more of the work done in providing rotation actually goes into rolling tube plug 74 rather than being lost to overcome friction. The torque curve typically starts at or near zero torque and progresses on a long, slightly ascending curve to a point of inflection 82 whereafter the torque increases more rapidly. Point of inflection 82 indicates that the outside diameter of tube plug 74 has contacted the inside surface of tube 66. The curve beyond point of inflection 82 increases rapidly and represents work done on the plug 74 in creating residual hoop stress.

The electrical signal representative of torque generated by the torque transducer is provided to strip chart recorder 70 for recording and so that the operator can observe the torque provided to roller-cage-mandrel assembly 80 in real time. Furthermore, the torque signal is provided to comparator 84 which compares the torque provided to roller-cage-mandrel assembly 80 to an adjustable, predetermined torque setpoint 86. When the torque applied to roller-cage-mandrel assembly 80 in the plug rolling operation reaches the predetermined torque setpoint 86, reversible pneumatic drive 44 is tripped off by actuating solenoid valve 68 thereby shutting off the air supply to reversible pneumatic drive 44. The predetermined torque setpoint 86 is a threshold torque setting which must be reached during the plug rolling operation to assure that sufficient work has been done to tube plug 74 to result in sufficient residual hoop stress to assure the integrity of the seal between tube plug 74 and tube 66. The operator then reverses the direction of rotation of reversible pneumatic drive 44 by activating solenoid valve 67 which, in turn, reverses the direction of rotation of tube plug rolling roller-cage-mandrel assembly 80 releasing roller-cage-mandrel assembly 80 for axial withdrawal from the interior of tube plug 74.

The work expended on the tube plug 74 during a rolling operation to thin the wall thereof can be expressed as torque applied to roller-cage-mandrel assembly 80 over an elapsed period of time. After tube plug 74 has expanded to contact the inside surface of tube 66, as indicated by point of inflection 82, the torque increases rapidly as work is expended in thinning the wall of plug 74. The precise torque that provides a 4% wall thinning is determined experimentally, is a function of the amount of material displaced and is lower for a smaller diameter tube plug than for a larger diameter tube plug. For a typical steam generator tube 66 having an inside diameter of approximately 1.97 centimeters (0.775 inches), a tube plug having a wall thickness of approximately 0.00196 millimeters (0.05 inches) and a width of rolled plug of approximately 2.54 centimeters (1 inch), thinning the wall of tube plug 74 by approximately 4 percent results in a final rolling torque of approximately 150 inch pounds which is approximately predetermined torque setpoint 86.

Once the torque that provides a 4% wall thinning under substantially constant conditions is determined, it may be used to determined torque setpoint 86 in accordance with known practice. Reaching torque setpoint 86 during a plug 74 rolling operation may indicate that sufficient work has been done on tube plug 74 to achieve a corresponding predetermined amount of wall thinning. A tube plug 74 inserted in a tube 66 and having a slight interference fit therebetween may rotate and subsequently cease rotating during a rolling operation causing a torque pulse to temporarily exceed predetermined torque setpoint 86 thereby giving a false indication that sufficient work has been done on plug 74 to achieve 4% wall thinning.

Residual hoop stress holds plug 74 in intimate contact with the interior surface of tube 66 with sufficient radial force to form an adequate seal therebetween to prevent fluid passage through tube 66 under the worst operating conditions anticipated. Residual hoop stress is created in plug 74 by thinning the wall thereof after plug 74 is inserted into tube 66. Work must be expended on tube plug 74, such as by a rolling operation, to displace a portion of the wall material thereby thinning the wall of tube plug 74.

A relationship exists between the amount of work expended in wall thinning and the corresponding amount of wall thinning achieved with other parameters such as the material properties and inside diameter of tube 66, the material properties and configuration of plug 74, the roller-cage-mandrel assembly 80 and the rate of torque application by drive 44 remaining substantially constant. The amount of wall thinning required in a tube plug 74 to provide sufficient residual hoop stress has been determined experimentally by static pressure tests and flexure tests to be approximately 4 percent.

The strip chart recording documents how much work has been done on tube plug 74 and can be used to assure sufficient work has been done on plug 74 to achieve a predetermined amount of wall thinning. The work done on tube plug 74 subsequent to plug 74 being expanded into initial contact with the interior wall of tube 66 is represented as the area under the recorded torque curve between point of inflection 82, the vertical projection thereof on the time axis, point 98 where the recorded torque curve reaches the predetermined torque limit setpoint 86, and the vertical projection thereof on the time axis. By comparing the work done in a tube plug roll operation to the amount of work expended on tube plug 74 in a statistical norm rolling operation derived from many test roll operations under substantially constant conditions, said work which may be predetermined, the integrity of the seal between tube plug 74 and the interior surface of tube 66 can be inferred. Should the work done in a tube plug rolling operation exceed a predetermined minimum amount of work the roll has provided an adequate seal; if the work done is less than the predetermined minimum amount of work, plug 74 should be rerolled or replaced.

The work done between point of inflection 82 and point 98 can be evaluated by any known technique. The torque curve can be integrated as a function of time, in real time for example, yielding the area under the torque curve representative of work done in thinning the wall of plug 74. Alternatively, the work represented by the area under the torque curve may be evaluated using a template representing the predetermined amount of work having a tolerance band of acceptable work. The torque as a function of time curve, absent slippage of tube plug 74, has a characteristic shape subsequent to point of inflection 82 for a tube roll operation, see for example FIGS. 8 and 9. Since the curve has a characteristic shape, knowing statistical norms for the torque at both point of inflection 82 and point 98 as well as the statistical norm for the time difference between point of inflection 82 and point 98 permits a comparison of the actual work done in rolling a tube plug 74 to a predetermined amount of work to assure that sufficient wall thinning has been achieved.

Should tube plug 74 spin within tube 66, the torque curve never reaches a point of inflection 82. This condition can be detected by monitoring the actual torque provided to roller-cage-mandrel assembly 80 as recorded in the strip chart recording produced by strip chart recorder 70. A tube plug 74 that spins within tube 66 may indicate that a tube plug 74 having an enlarged diameter 76 greater than the initial plug inserted in tube 66 is required. A tube plug 74 that spins may cease spinning and the torque, recorded on strip chart recorder 70, would so indicate and further the torque curve would indicate that the plug seated, the point of inflection was reached and sufficient work was done on tube plug 74 to provide an acceptable plug roll operation. The operator observing the strip chart recording in real time can reroll a tube plug for assurance of a tube plug 74 being properly rolled. A rerolled plug 74 gives a very short lead in portion of the torque curve and subsequent to point of inflection 82 has a very steep slope as there is already intimate contact between tube plug 74 and tube 66.

Figure 8:
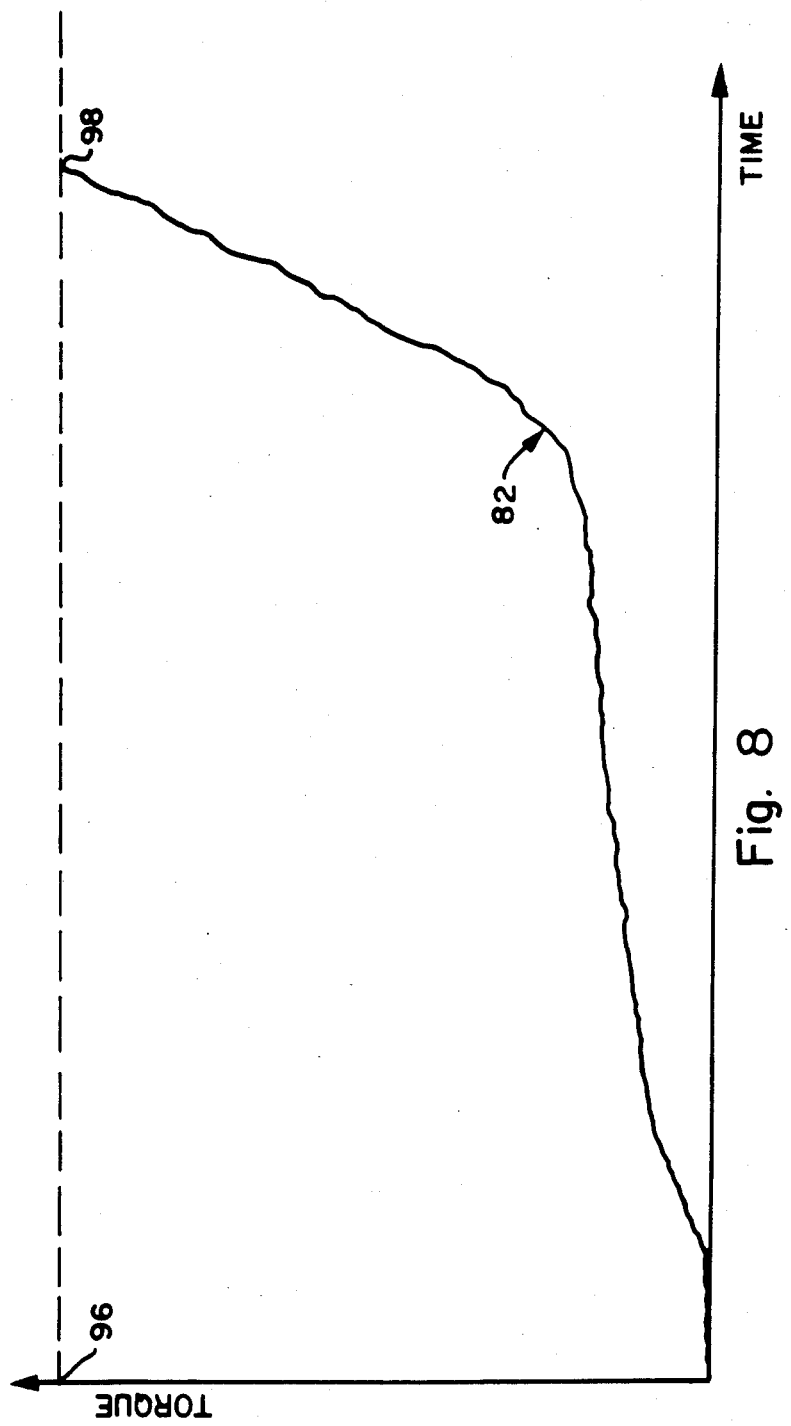
FIG. 8 is a typical torque as a function of time curve produced during a plug roll operation as recorded on a strip chart recorder.
Figure 9:
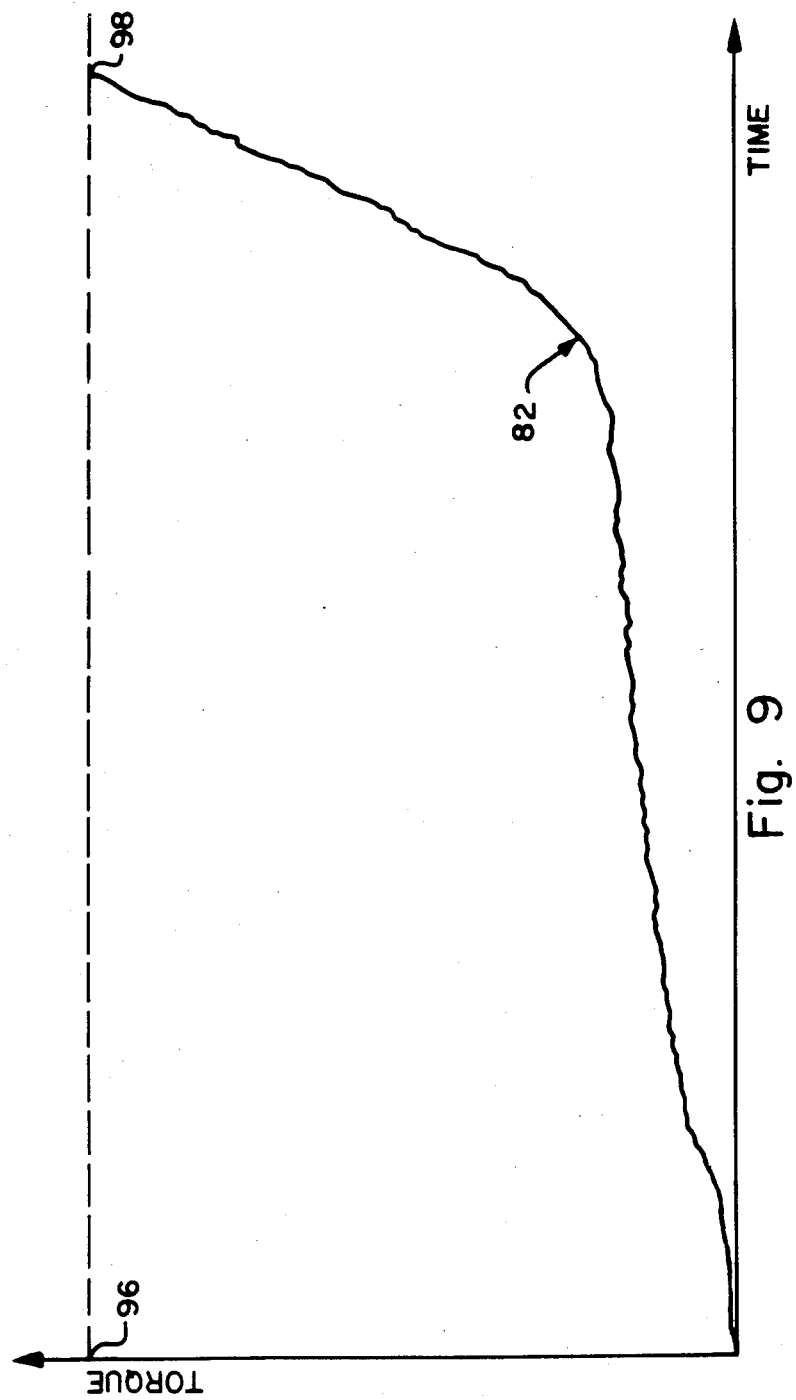
FIG. 9 is a torque as a function of time curve produced during a plug roll operation as recorded on a strip chart recorder wherein the tube in the region of the plug roll is larger than that shown in FIG. 8.

Comparing the torque as a function of time curves shown as FIGS. 8 and 9, it is evident that the length of the lower portion of the curve in the slightly ascending region is longer in FIG. 9 than in FIG. 8. The longer length of the lower portion of the torque curve before point of inflection 82 in FIG. 9 indicates that the inside diameter of the tube being plugged with reference to FIG. 9 is greater than the inside diameter of the tube being plugged with reference to FIG. 8.

Figure 10:
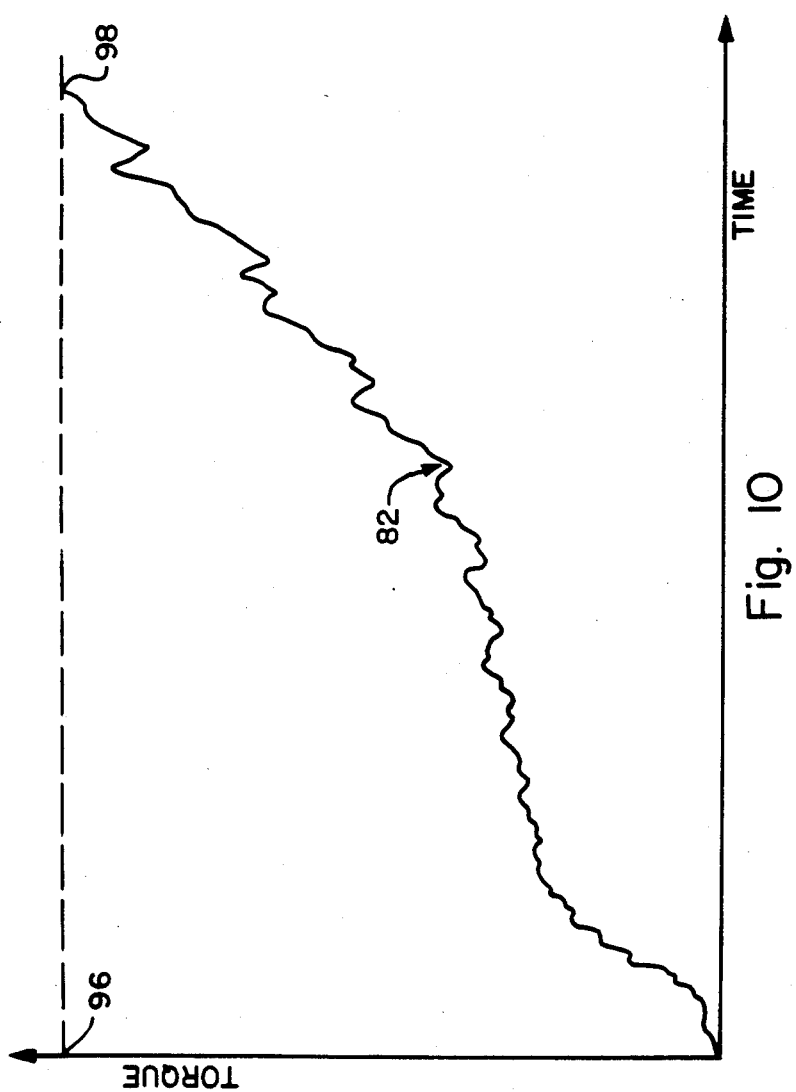
FIG. 10 is a torque as a function of time curve produced during a plug roll operation as recorded on a strip chart recorder wherein the roller-cage-mandrel assembly was in need of lubrication.

FIG. 10 shows a torque as a function of time curve recorded in a plug rolling operation in which the roller-cage-mandrel assembly 80 was in need of being lubricated. The torque curve shows an uneven curve with cyclic peaks indicative of the lack of lubricant. When a roller needs relubricating, an erratic oscillation of sticking-releasing occurs on the sloped portion of the torque curve subsequent to point of inflection 82. A similar cyclicly uneven curve would result from a gall spot on the mandrel.

Even though a plug 74 may be initially seated, the plug may release and grab during the plug roll operation. When a plug rotates during the rolling process, the torque provided to tube plug rolling roller-cage-mandrel assembly 80 decreases rapidly. However, it can be determined from the strip chart recording that sufficient work has been done on plug 74 to achieve the proper amount of wall thinning. If a plug releases during a plug roll operation, it must do so before point of inflection 82 is reached because after point of inflection 82 is reached plug 74 is in intimate contact with tube 66 and the friction therebetween is so great that the plug 74 will not rotate.

Figure 11:
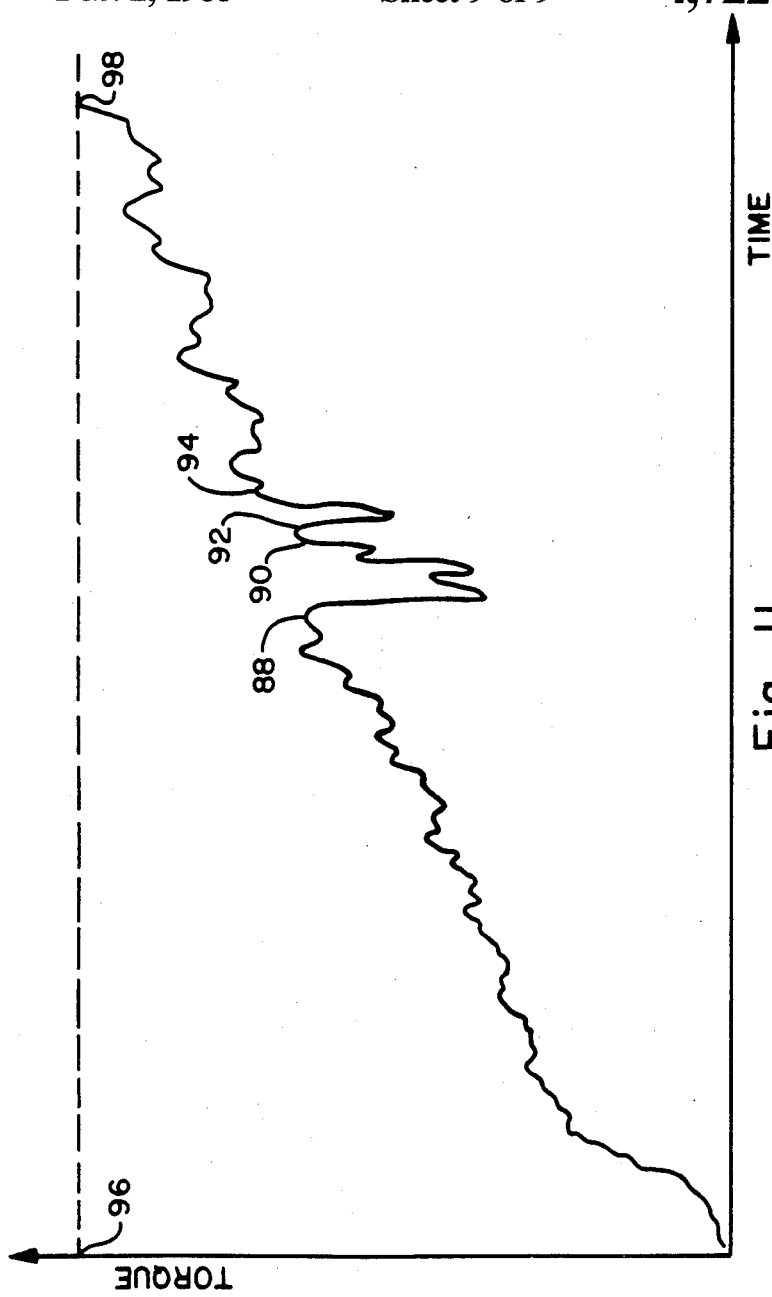
FIG. 11 is a torque as a function of time curve produced during a plug roll operation as recorded on a strip chart recorder in which the interference fit between the inserted plug and the tube being plugged released, grabbed, released and again grabbed.

FIG. 11 shows a torque as a function of time graph made during a plug roll operation in which plug 74 released, grabbed, released and grabbed again. Plug 74 initially released at point 88 and rotated through point 90 where plug 74 ceased rotating. Plug 74 subsequently released at point 92 and rotated through point 94 where plug 74 ceased rotating. It is evident from the torque curve of FIG. 11 that sufficient work was done on tube plug 74 to increase the torque above a threshold predetermined torque limit setpoint 86 at which reversible pneumatic drive 44 is tripped. Superimposed on the torque curve of FIG. 11 is a cyclic peak indicative of a problem with the roller-cage-mandrel assembly in this case lack of lubrication.

Because the plug roll operation trips the reversible pneumatic drive 44 upon reaching a threshold torque, it is possible when plug 74 releases and subsequently ceases rotation for a torque spike to momentarily exceed the threshold torque or predetermined torque setpoint 86 and trip the reversible pneumatic drive 44 off-line. Since the torque as a function of time curve is available to the operator by way of strip chart recorder 70, the area under the torque curve can be evaluated to determine whether sufficient work has been done on tube plug 74 to provide an acceptable seal between plug 74 and tube 66, and the tube plug 74 can be rerolled, if necessary, to obtain the seal integrity between tube plug 74 and tube 66.

Although the preferred embodiment has been described with respect to a rotation station having a reversible pneumatic drive, it is not limited thereto. Any reversible drive capable of providing the necessary torque for the brushing and rolling operations will suffice.

I claim:

1. A method of installing a plug in a heat exchanger tube to prevent flow therethrough, employing a rotation station in conjunction with a robotic manipulator, comprising the steps of:
   (a) preparing an internal surface of the heat exchanger tube;
   (b) inserting a plug into the prepared tube with a slight friction fit therebetween;
   (c) inserting a tube plug rolling roller-cage-mandrel assembly into the tube plug;
   (d) rolling the internal surface of the tube plug to achieve wall thinning of the tube plug thereby creating therein residual hoop stress to provide a seal between the heat exchanger tube and the tube plug;
   (e) recording an electrical signal indicative of torque applied to the tube plug rolling roller-cage-mandrel assembly during the plug internal surface rolling operation;
   (f) comparing the electrical signal indicative of torque to a predetermined torque limit setpoint;
   (g) terminating the plug internal surface rolling operation upon the electrical signal indicative of torque reaching the predetermined torque limit setpoint; and
   (h) predetermining an acceptable amount of work required to provide a predetermined amount of tube plug wall thinning;
   (i) comparing the work done in rolling the plug as represented by the area under the recorded torque curve, between the tube plug contacting the interior surface of the tube and the torque reaching the predetermined torque limit setpoint, to the predetermined acceptable amount of work required to provide a predetermined amount of tube plug wall thinning;
   (j) repeating steps (d) through (g) when the work done in rolling the plug is less than the predetermined acceptable amount of work; and
   (k) removing the tube plug rolling roller-cage-mandrel from the tube plug.

2. A method of installing a plug as recited in claim 1 wherein the step of preparing the internal surface of the heat exchanger tube further comprises:
   inserting a brush into the rotation station drive;
   positioning the rotation station using the robotic manipulator proximate a tube end in a tube sheet that is to be plugged;
   initiating rotation of the brush;
   inserting the rotating brush driven by a torque producing means on the rotation station into the interior of the tube to a depth where the plug will seat;
   converting the torque applied to the rotating brush to an electrical signal;
   recording the electrical signal indicative of torque during the inserting operation;
   brushing the internal surface of the tube to remove foreign matter;

recording the electrical signal indicative of torque applied to the rotating brush during the brushing operation;

monitoring in real time the recorded torque signal applied to rotating brush during the brushing operation to detect a breakpoint followed by an increase in torque indicating that the foreign matter has been removed from the interior surface of the tube;

terminating the brushing operation subsequent to a substantial increase in monitored torque;

removing the brush from the tube; and removing the brush from the rotation station drive.

3. A method of installing a tube plug as recited in claim 2 further comprising the steps of:

inserting a tube entrance rolling roller-cage-mandrel assembly into the rotation station drive;

inserting the tube entrance rolling roller-cage-mandrel assembly into an entrance of the brushed tube;

rolling the internal surface of the tube entrance with the roller-cage-mandrel assembly;

recording the electrical signal indicative of torque applied to the roller-cage-mandrel assembly during the rolling operation; and removing the roller-cage-mandrel assembly from the tube entrance.

4. A method of installing a plug as recited in claim 3 further comprising the step of monitoring in real time the recorded plug internal surface rolling operation torque to detect an uneven torque curve with cyclic peaks indicative of lack of lubrication on the roller-cage-mandrel assembly.

5. A method of installing a plug as recited in claim 1 further comprising the step of monitoring in real time the recorded plug internal surface rolling operation torque to detect a substantial decrease in torque indicative of the plug rotating during the rolling operation.

6. A method of installing a plug as recited in claim 5 further comprising the step of monitoring in real time the recorded plug internal surface rolling operation torque to detect subsequent to a substantial decrease in torque a substantial increase in torque sufficient to terminate the internal surface rolling operation prior to sufficient work being done on the plug to create therein residual hoop stress.

7. Apparatus for installing a plug in a heat exchanger tube to prevent flow therethrough, the heat exchanger tube terminating in a tube sheet, comprising:

a robotic manipulator for moving about the heat exchanger tube sheet;

a drive chuck for engaging a plurality of tools one at a time;

a reversible drive means mounted from the robotic manipulator and engaging the drive chuck for producing torque to rotate the drive chuck;

a rigidly supported torque transducer means for monitoring the torque applied to the drive chuck and for generating an electrical signal representative thereof;

means for comparing the torque applied to the drive chuck to a predetermined torque threshold setpoint, the comparing means having a first input port for receiving the electrical signal representative of torque applied to the drive chuck, a second input port for receiving the predetermined torque threshold setpoint and an output port at which the compared torque signal is presented;

means responsive to the compared torque signal for deenergizing the reversible drive means when the torque applied to the drive chuck exceeds the predetermined torque threshold setpoint; and recording means for receiving and recording the electrical signal representative of the torque applied to the drive chuck, whereby as torque is applied to the drive chuck to rotate a tool the actual torque applied to the drive chuck is monitored and recorded in real time to verify that at least a predetermined torque has been applied to the drive chuck and further, once the predetermined torque has been applied to the drive chuck the reversible drive means is deenergized.

8. Apparatus as recited in claim 7 wherein the reversible drive means is a pneumatic motor and the means responsive to the compared torque signal for deenergizing the pneumatic motor is a solenoid valve that interrupts air flow to the pneumatic motor.

9. Apparatus as recited in claim 7 wherein the predetermined torque threshold setpoint is adjustable.

10. Apparatus for installing a plug in a heat exchanger tube to prevent flow therethrough, the heat exchanger tube terminating in a tube sheet, comprising:

a robotic manipulator for moving about the heat exchanger tube sheet;

a drive chuck for engaging a plurality of tools one at a time;

a reversible drive means mounted from the robotic manipulator and engaging the drive chuck for producing torque to rotate the drive chuck and having a shaft;

a first pulley mounted on the reversible drive means shaft;

a rigidly supported torque transducer means for monitoring the torque applied to the drive chuck and for generating an electrical signal representative thereof, said torque transducer means having a shaft;

a second pulley mounted on the torque transducer shaft;

a belt engaging both the first and second pulleys for transferring torque therebetween;

gear means interposed between the drive chuck and torque transducer means for making an angular transition in the torque thereby permitting the drive chuck to rotate at an axis substantially perpendicular to the torque transducer;

means for comparing the torque applied to the drive chuck to a predetermined torque threshold setpoint, the comparing means having a first input port for receiving the electrical signal representative of torque applied to the drive chuck, a second input port for receiving the predetermined torque threshold setpoint and an output port at which the compared torque signal is presented;

means responsive to the compared torque signal for deenergizing the reversible drive means when the torque applied to the drive chuck exceeds the predetermined torque threshold setpoint; and recording means for receiving and recording the electrical signal representative of the torque applied to the drive chuck, whereby as torque is applied to the drive chuck to rotate a tool the actual torque applied to the drive chuck is monitored and recorded in real time to verify that at least a predetermined torque has been applied to the drive chuck, to document the work done in rolling the tube plug, and further, once the predetermined torque has been applied to the drive chuck the reversible drive means is deenergized.

11. Apparatus as recited in claim 10 wherein the reversible drive means is a pneumatic motor and the means responsive to the compared torque signal for deenergizing the pneumatic motor is a solenoid valve that interrupts air flow to the pneumatic motor.

12. Apparatus as recited in claim 10 wherein the predetermined torque threshold setpoint is adjustable.

* * * * *